United States Patent
Oota

(10) Patent No.: US 7,693,148 B2
(45) Date of Patent: Apr. 6, 2010

(54) DIGITAL BROADCAST RECEIVING APPARATUS AND COMMUNICATION INFORMATION TRANSMITTING METHOD

(75) Inventor: Yoshinori Oota, Kanagawa (JP)

(73) Assignee: Sony Corporation (JP)

( * ) Notice: Subject to any disclaimer, the term of this patent is extended or adjusted under 35 U.S.C. 154(b) by 1590 days.

(21) Appl. No.: 10/488,220

(22) PCT Filed: Aug. 21, 2002

(86) PCT No.: PCT/JP02/08430

§ 371 (c)(1),
(2), (4) Date: Sep. 21, 2004

(87) PCT Pub. No.: WO03/021942

PCT Pub. Date: Mar. 13, 2003

(65) Prior Publication Data

US 2005/0039216 A1 Feb. 17, 2005

(30) Foreign Application Priority Data

Sep. 3, 2001 (JP) .............................. 2001-266324

(51) Int. Cl.
*H04L 12/28* (2006.01)
(52) U.S. Cl. ........................................ 370/392; 370/349
(58) Field of Classification Search ................ 370/386, 370/349, 389, 390, 392; 395/685; 725/31, 725/95, 116–118
See application file for complete search history.

(56) References Cited

U.S. PATENT DOCUMENTS

| | | | |
|---|---|---|---|
| 5,805,886 A | * | 9/1998 | Skarbo et al. ................ 719/318 |
| 5,995,606 A | | 11/1999 | Civanlar et al. |
| 6,195,642 B1 | * | 2/2001 | Izumi et al. ..................... 705/1 |
| 6,477,708 B1 | * | 11/2002 | Sawa ........................... 725/116 |
| 6,490,356 B1 | * | 12/2002 | Beuque ........................ 380/239 |
| 6,651,250 B1 | * | 11/2003 | Takai ........................... 725/31 |
| 2002/0031120 A1 | * | 3/2002 | Rakib ........................... 370/386 |

FOREIGN PATENT DOCUMENTS

| | | |
|---|---|---|
| JP | 8-340332 A1 | 12/1996 |
| JP | 2001-136136 A1 | 5/2001 |
| WO | WO-99/43158 A1 | 8/1999 |

OTHER PUBLICATIONS

Office Action from corresponding European Application 02 760 687.0, dated Mar. 27, 2009.

* cited by examiner

*Primary Examiner*—William Trost, IV
*Assistant Examiner*—Emmanuel Maglo
(74) *Attorney, Agent, or Firm*—Lerner, David, Littenberg, Krumholz & Mentlik, LLP

(57) ABSTRACT

A digital broadcast receiving apparatus that can transmit and receive data to and from a bidirectional server in either of a form of communication via a telephone line and a form of communication via the Internet. The digital broadcast receiving apparatus having a network interface for performing data transmission and reception via the Internet and a modem includes reading means for reading an IP address of a bidirectional server for the Internet from a transport stream; and decoding means for detecting a method describing a BASIC procedure and decoding a data processing content related to transmitting and receiving operation; wherein data transmission and reception is performed via the network interface using an IP packet on the basis of the decoded data processing content.

5 Claims, 10 Drawing Sheets

DATA STRUCTURE OF BROADCASTER INFORMATION

FIG. 5

☐ CONTINUOUS INTERNET CONNECTION

☐ INTERNET CONNECTION VIA PROVIDER

☐ CONNECTION VIA TELEPHONE LINE

F I G. 7

```
function sendTextToServer()
{
    browser.connect("0312345678", "00000000", 0, 1, 100000);
    browser.sendTextData("ABCDEFGHI", 100000);
    var data = browser.receiveTextData(100);
    browser.disconnect();
}
```

DIGITAL BROADCAST RECEIVING APPARATUS AND COMMUNICATION INFORMATION TRANSMITTING METHOD

CROSS-REFERENCE TO RELATED APPLICATIONS

The present application is a national stage application under 35 U.S.C. §371 of International Application No. PCT/JP02/08430, filed Aug. 21, 2002, which claims priority from Japanese Application No. 2001-266324, filed Sep. 3, 2001, the disclosures of which are hereby incorporated by reference herein.

BACKGROUND OF THE INVENTION

1. Technical Field

The present invention relates to a digital broadcast receiving apparatus that receives a digital broadcast signal of digital broadcasting such as BS digital broadcasting or the like, and transmits and receives data to and from a bidirectional server for response related to a received broadcast program via a telephone line or the Internet, and a communication information transmitting method that enables data transmission and reception between the digital broadcast receiving apparatus and the bidirectional server on the basis of a common method (processing procedure) described by a data broadcast description script.

2. Background Art

Digital broadcast receiving apparatus such as digital televisions (hereinafter referred to as DTVs), set-top boxes (hereinafter referred to as STBs) and the like have a bidirectional communication function realized therein to receive a digital broadcast signal of digital broadcasting such as BS digital broadcasting or the like, and transmit and receive data to and from a bidirectional server for response which server is related to a received broadcast program and owned by a broadcasting station, for example. For the bidirectional communication function, a BASIC procedure of X.28, which is a communication standard for peer-to-peer communication using a 2400-bps modem, is currently employed in performing data transmission and reception between the digital broadcast receiving apparatus and the bidirectional server.

Recently, in view of advantages of the development of Internet networks in that high-speed and inexpensive communication can be realized and congestion can be dispersed, for example, there has been a desire to realize the above bidirectional communication function by performing data transmission and reception via the Internet on the basis of TCP/IP instead of the conventional data transmission and reception via a telephone line on the basis of the BASIC procedure.

Even if digital broadcast receiving apparatus have the function of performing data transmission and reception via the Internet, not all broadcasting stations can change over to an operational form using a bidirectional server for the Internet as a response server. The broadcasting station side, on the other hand, needs to maintain a form of service for data transmission and reception based on the BASIC procedure in consideration of convenience of users using existing digital broadcast receiving apparatus. Therefore, in order to realize the bidirectional communication function in digital broadcast receiving apparatus, a method (processing procedure) for realizing a form of communication based on the BASIC procedure must be described in data broadcast contents transmitted by a digital broadcast signal using a digital broadcast description script. In order to realize also a form of communication based on TCP/IP in such an environment with operational limitations, it is necessary to describe a method for realizing the form of communication based on TCP/IP and also describe a processing procedure for changing between the methods as required according to communication means of the digital broadcast receiving apparatus. Thus, it takes time and labor to create an overall method for realizing the bidirectional communication function, and cost of creating the method becomes high. Incidentally, in the following description, the bidirectional server for the Internet will be referred to as a bidirectional WEB server as appropriate to be differentiated from bidirectional servers for telephone lines.

SUMMARY OF THE INVENTION

The present invention has been made to solve problems as described above, and it is accordingly an object of the present invention to provide a digital broadcast receiving apparatus that can transmit and receive data to and from a bidirectional server in either of a form of communication via a telephone line and a form of communication via the Internet.

It is another object of the present invention to provide a communication information transmitting method for notifying, from a broadcasting station side, information allowing data transmission and reception to be performed between the digital broadcast receiving apparatus and the bidirectional server in either of the form of communication via a telephone line and the form of communication via the Internet, using a common method prepared using a data broadcast description script.

According to the present invention, there is provided a digital broadcast receiving apparatus including a network interface for performing data transmission and reception via Internet; and a modem for performing data transmission and reception via a telephone line.

With such a composition, data transmission and reception between the digital broadcast receiving apparatus and a bidirectional server related to a received broadcast program can be performed via the Internet at a high speed and a low cost. Also, even when only a bidirectional server for telephone lines is provided by a broadcasting station side for the received broadcast program, data transmission and reception can be performed between the digital broadcast receiving apparatus and the bidirectional server for response provided by the broadcasting station side by using the modem.

According to the present invention, there is provided a digital broadcast receiving apparatus further including address reading means for reading an IP address of a bidirectional server for the Internet related to a broadcast program transmitted by a transport stream from the transport stream in which the IP address is recorded according to a predetermined rule.

With such a composition, it is therefore possible to eliminate a need for registering access information on a bidirectional server related to each broadcast program in advance in the digital broadcast receiving apparatus and thus simplify a system configuration related to data transmission and reception. It is also possible for the broadcasting station side to send access information on a bidirectional server related to each broadcast program by a broadcast wave and change a bidirectional server prepared for data transmission and reception as required.

According to the present invention, there is provided a digital broadcast receiving apparatus including address reading means for reading an IP address of a bidirectional server for the Internet related to a broadcast program transmitted by a transport stream from the transport stream in which the IP address and a method for performing data transmission and reception on the basis of a BASIC procedure between the digital broadcast receiving apparatus and a bidirectional server for a telephone line related to the broadcast program are recorded according to a predetermined rule; and decoding means for detecting the method and decoding data itself to be transmitted and received or a data processing content related to transmitting and receiving operation; wherein data transmission and reception is performed via a network interface using an IP packet on the basis of the decoded data itself or the decoded data processing content.

With such a composition, data transmission and reception between the digital broadcast receiving apparatus and a bidirectional server can be performed using either of the form of communication via a telephone line and the form of communication via the Internet on the basis of the common method. It is thus possible to simplify the creation of a method for realizing data transmission and reception and hence reduce cost.

According to the present invention, there is provided a digital broadcast receiving apparatus further including both or either one of first used line display means indicating that data transmission and reception between the digital broadcast receiving apparatus and a bidirectional server is being performed via a telephone line and second used line display means indicating that data transmission and reception between the digital broadcast receiving apparatus and a bidirectional server is being performed via the Internet.

With such a composition, a communication line used for the data transmission and reception between the digital broadcast receiving apparatus and the bidirectional server can be readily identified. Thus a user can roughly grasp cost and the like of the data transmission and reception.

According to the present invention, there is provided a communication information transmitting method, wherein a method for performing data transmission and reception on the basis of a BASIC procedure between a digital broadcast receiving apparatus and a bidirectional server for response provided by a broadcasting station and broadcaster information including at least an IP address of a bidirectional server for the Internet related to a broadcast program transmitted from the broadcasting station are transmitted from the broadcasting station according to a predetermined rule by a transport stream transmitting the broadcast program so as to aid in performing data transmission and reception between the digital broadcast receiving apparatus and the bidirectional server provided by the broadcasting station.

With such a composition, when the digital broadcast receiving apparatus has address reading means for reading the IP address and decoding means for detecting the method and decoding data itself to be transmitted and received or a data processing content related to transmitting and receiving operation, data transmission and reception between the digital broadcast receiving apparatus and the bidirectional server can be performed using either of the form of communication via a telephone line and the form of communication via the Internet on the basis of the common method. It is thus possible to simplify the creation of a method for realizing data transmission and reception and hence reduce cost.

According to the present invention, there is provided a communication information transmitting method, wherein a method for performing data transmission and reception on the basis of a BASIC procedure between a digital broadcast receiving apparatus and a bidirectional server for response provided by a broadcasting station and broadcaster information including at least distinguishing information for distinguishing whether a bidirectional server for the Internet related to a broadcast program transmitted from the broadcasting station is provided and an IP address of the bidirectional server for the Internet related to the broadcast program are transmitted from the broadcasting station according to a predetermined rule by a transport stream transmitting the broadcast program so as to aid in performing data transmission and reception between the digital broadcast receiving apparatus and the bidirectional server provided by the broadcasting station.

With such a composition, by referring to the distinguishing information for distinguishing whether a bidirectional server for the Internet is provided in the digital broadcast receiving apparatus, an appropriate communication form can be selected quickly and surely for data transmission and reception between the digital broadcast receiving apparatus and the bidirectional server.

In the communication information transmitting method according to the present invention, the broadcaster information includes version information to determine, even when there is an update to the broadcaster information, order of creation of the different pieces of broadcaster information.

With such a composition, it is possible to determine whether the broadcaster information is already registered. When the broadcaster information is already registered, a communication file and the like created on the basis of the broadcaster information are available, and hence it is possible to readily establish a communication line between the digital broadcast receiving apparatus and a bidirectional server, for example.

BRIEF DESCRIPTION OF THE DRAWINGS

FIG. 5 is a diagram showing an example of a screen for setting a communication form to be used;

FIG. 7 is a diagram showing an example of ECMAScript describing a method for data transmission and reception;

DETAILED DESCRIPTION

An embodiment of the present invention will hereinafter be described with reference to the accompanying drawings. Incidentally, in order to clarify correspondences between elements of the embodiment that are described in the embodiment of the present invention and elements of the invention that are described in claims, the elements of the invention which elements are described in the claims and correspond to the respective elements of the embodiment will be indicated by parentheses as appropriate in the description below of the embodiment of the present invention.

First Embodiment

Figure 1:
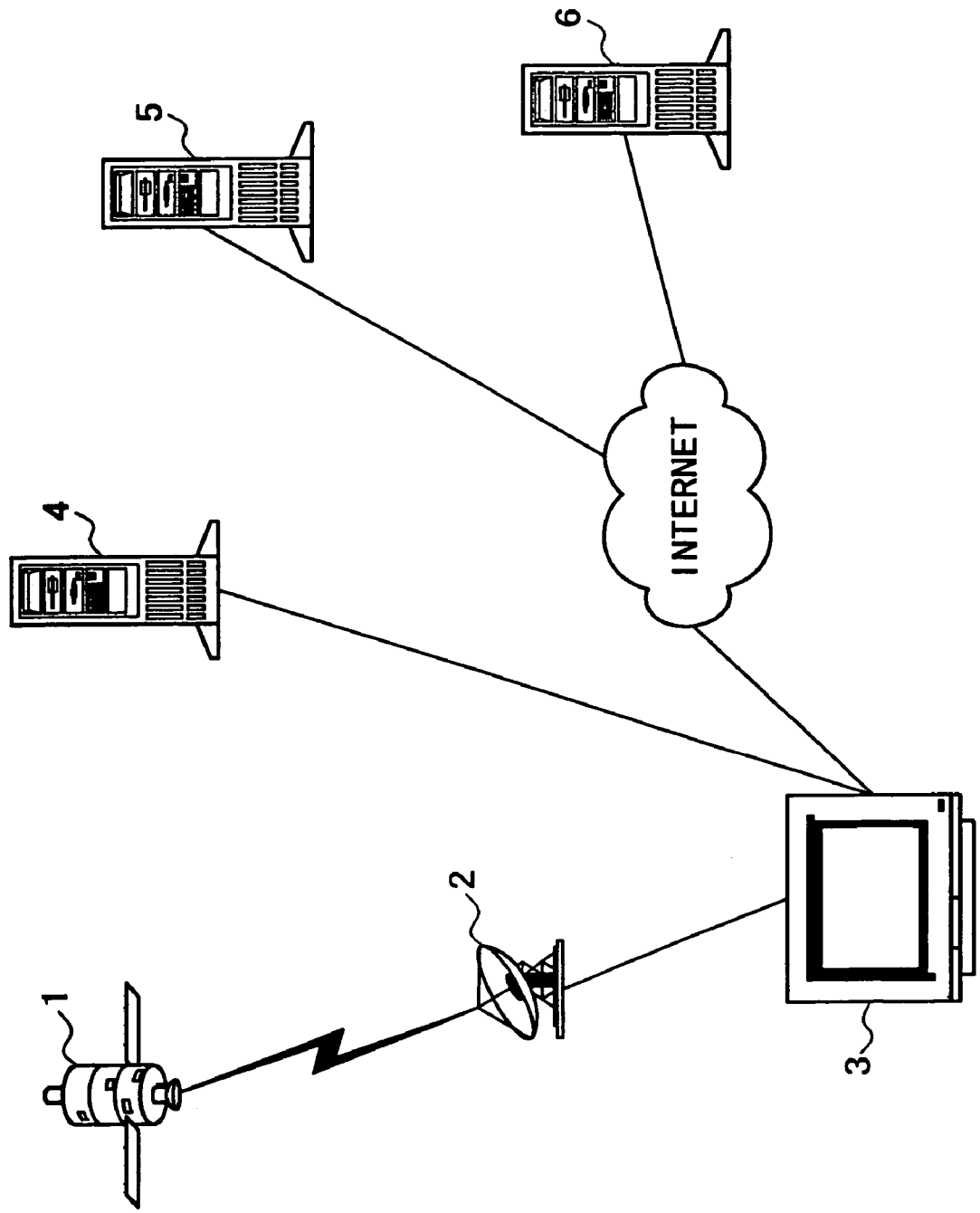
FIG. 1 is a diagram showing a general system configuration for realizing a bidirectional communication function of a digital broadcast receiving apparatus.

FIG. 1 is a diagram showing a general system configuration for realizing a bidirectional communication function of a digital broadcast receiving apparatus. In FIG. 1, reference numeral 1 denotes a digital broadcasting satellite. Reference numeral 2 denotes an antenna for receiving broadcast waves transmitted from the digital broadcasting satellite 1. Reference numeral 3 denotes a DTV (digital broadcast receiving apparatus) for extracting a video signal and the like of a broadcast program desired by a user from a digital broadcast signal inputted from the antenna 2, and making video display and the like. Reference numeral 4 denotes a bidirectional server connected to the DTV 3 via a telephone line. Reference numerals 5 and 6 denote bidirectional WEB servers connected to the DTV 3 via the Internet.

Figure 2:
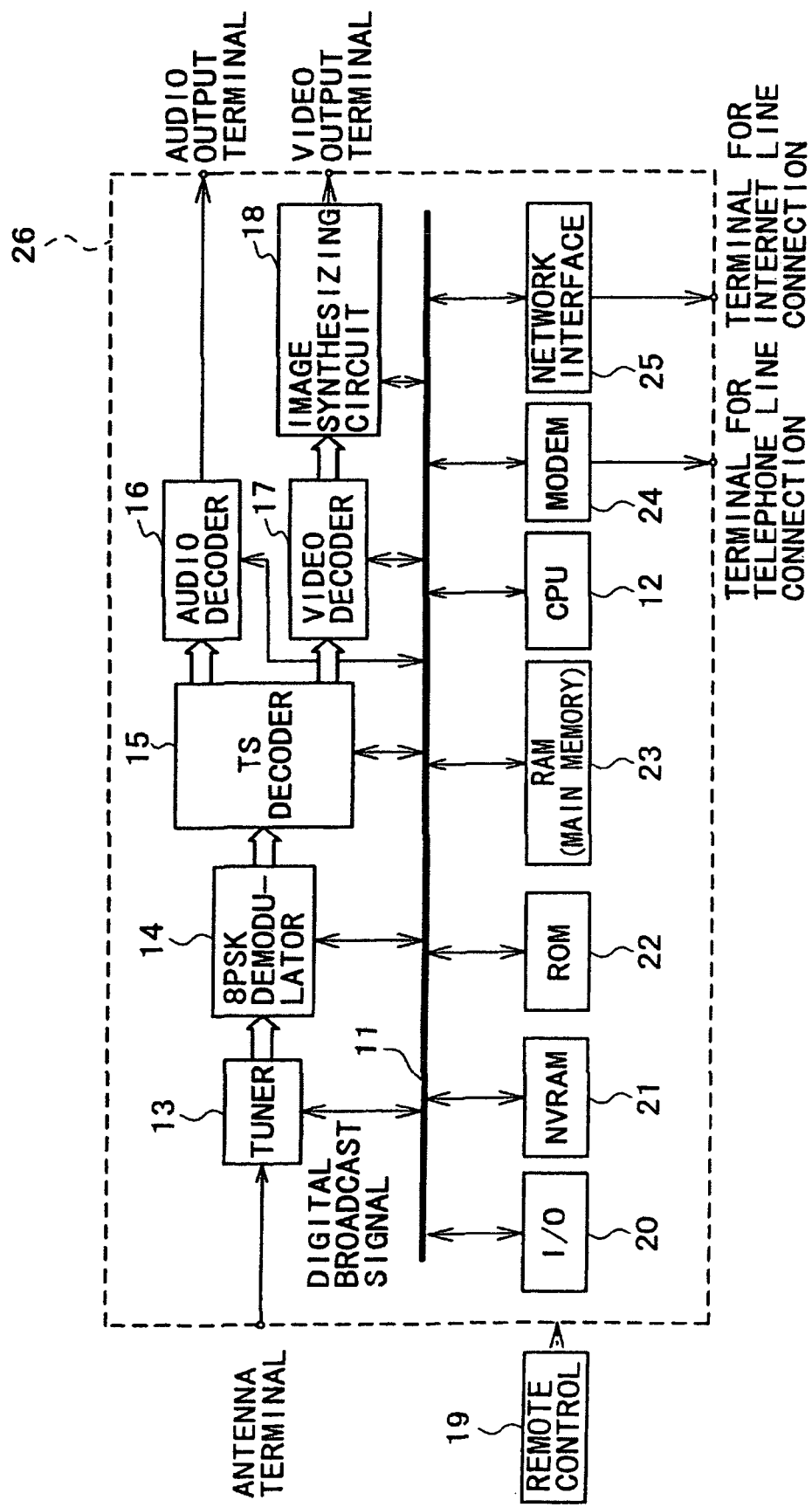
FIG. 2 is a block diagram showing a configuration of a digital broadcast receiving apparatus according to a first embodiment of the present invention.

FIG. 2 is a block diagram showing a configuration of the digital broadcast receiving apparatus according to the first embodiment of the present invention. In FIG. 2, reference numeral 11 denotes a system bus within the digital broadcast receiving apparatus. Reference numeral 12 denotes a CPU connected to each hardware component within the digital broadcast receiving apparatus via the system bus 11, for effecting centralized control of each component. Reference numeral 13 denotes a tuner for selecting a channel of a broadcast program desired by a user from a plurality of channels. Reference numeral 14 denotes an 8PSK demodulator for performing digital demodulation. Reference numeral 15 denotes a TS decoder for decoding a transport stream and separating the transport stream into various data. Reference numeral 16 denotes an audio decoder for expanding compressed audio data. Reference numeral 17 denotes a video decoder for expanding compressed video data. Reference numeral 18 denotes an image synthesizing circuit for changing video output from the video data to broadcast program information or the like included in data broadcast contents, or producing video output by superimposing the broadcast program information or the like on the video data. Reference numeral 19 denotes a remote control. Reference numeral 20 denotes an interface circuit for receiving an infrared signal outputted from the remote control 19 and transmitting the user instruction information. Reference numeral 21 denotes an NVRAM for storing user information, broadcaster information and the like. Reference numeral 22 denotes a ROM as a read-only memory for permanently storing a program executed at a time of turning on power, a basic input output system (BIOS) for hardware operation, and the like. Reference numeral 23 denotes a RAM for loading executing program code for the CPU 12 and being used as a work area for an executing program. Reference numeral 24 denotes a modem for transmitting and receiving various data via a telephone line. Reference numeral 25 denotes a network interface for transmitting and receiving various data via the Internet. Reference numeral 26 denotes the digital broadcast receiving apparatus including the above components.

It is to be noted that while the apparatus configuration of the digital broadcast receiving apparatus for receiving BS digital broadcast is illustrated in FIG. 2, digital broadcast receiving apparatus for receiving CS digital broadcast or terrestrial digital broadcast can be implemented basically by using a similar apparatus configuration, though a demodulating method for performing digital demodulation is different. The RAM 23 has a program loaded therein for detecting a BIT (Broadcaster Information Table), which is one table of SI (Service Information), and reading broadcaster information to be described later recorded in the BIT. The CPU 12 executes the program on TS packets separated and outputted from the TS decoder 15, whereby address reading means for detecting a BIT and reading an IP address of a bidirectional server for the Internet, which address is one piece of broadcaster information, is realized. Further, the RAM 23 has a program loaded therein for detecting a method for transmitting and receiving data on the basis of a BASIC procedure between the digital broadcast receiving apparatus and a bidirectional server, and decoding contents described by the method. The CPU 12 executes the program on data broadcast contents separated and outputted from the TS decoder 15, whereby decoding means for detecting the method recorded in the data broadcast contents and decoding data itself to be transmitted and received or a data processing content related to transmitting and receiving operation is realized.

An outline of operation of the digital broadcast receiving apparatus will next be described.

The antenna 2 receives a broadcast wave of BS digital broadcast, a broadcast wave of CS digital broadcast, or a broadcast wave of terrestrial digital broadcast transmitted from a terrestrial broadcasting station or the digital broadcasting satellite 1, and down-converts the received RF signal by an antenna circuit attached to the antenna 2. In response to an instruction from the CPU 12, the tuner 13 performs channel selecting operation for extracting an intermediate-frequency signal corresponding to a channel that transmits a broadcast program desired by a user. The 8PSK demodulator 14 subjects the output signal from the tuner 13 to 8PSK demodulation, and then outputs a transport stream. The transport stream is formed by multiplexing mainly MPEG2-compressed video data and audio data, and data broadcast contents. As the latter data broadcast contents, broadcast program information such for example as EPG (Electric Program Guide) and the like are given. The transport stream also includes service information (SI) sent in a form of a table or a descriptor at predetermined periods for purposes of broadcasting. The method described by ECMAScript, which is a standard of data broadcast description scripts, for transmitting and receiving data between a digital broadcast receiving apparatus and a bidirectional server is transmitted as data broadcast contents in the transport stream by a data carousel system. As described above, broadcaster information given to aid in setting related to a communication form of data transmission and reception performed between a digital broadcast receiving apparatus and a bidirectional server is recorded in a BIT, which is one SI table, in the transport stream, and transmitted.

Next, the TS decoder 15 distinguishes each TS packets forming the transport stream to separate data of the TS packets into MPEG2-compressed video data, MPEG2-compressed audio data, data broadcast contents, and accompanying information such as a BIT. At this time, the TS decoder 15 outputs the compressed video data to the video decoder 17, outputs the compressed audio data to the audio decoder 16, and outputs the data broadcast contents and the accompanying information to storing means such as the NVRAM 21 or the RAM 23 controlled by the CPU 12 via the system bus 11. The audio decoder 16 decodes the compressed audio data, and then outputs an audio signal. The video decoder 17 subjects the compressed video data to MPEG2 decompression processing, thereby reproduces an original video signal, and then outputs the video signal.

The image synthesizing circuit 18 receives the data of the data broadcast contents separated and outputted by the TS decoder 15 and stored in the storing means. In response to an instruction from the CPU 12, the image synthesizing circuit 18 for example changes video output from the video signal from the video decoder 17 to the broadcast program information or the like, or produces video output by superimposing the broadcast program information or the like on the video signal from the video decoder 17. The remote control 19 transmits user instruction information for selection of a broadcast program or the like to the interface circuit 20 by infrared radiation. The interface circuit 20 transmits the user instruction information to the CPU 12 via the system bus 11.

Description will next be made of operation for data transmission and reception performed between the digital broadcast receiving apparatus and a bidirectional server.

Figure 3:
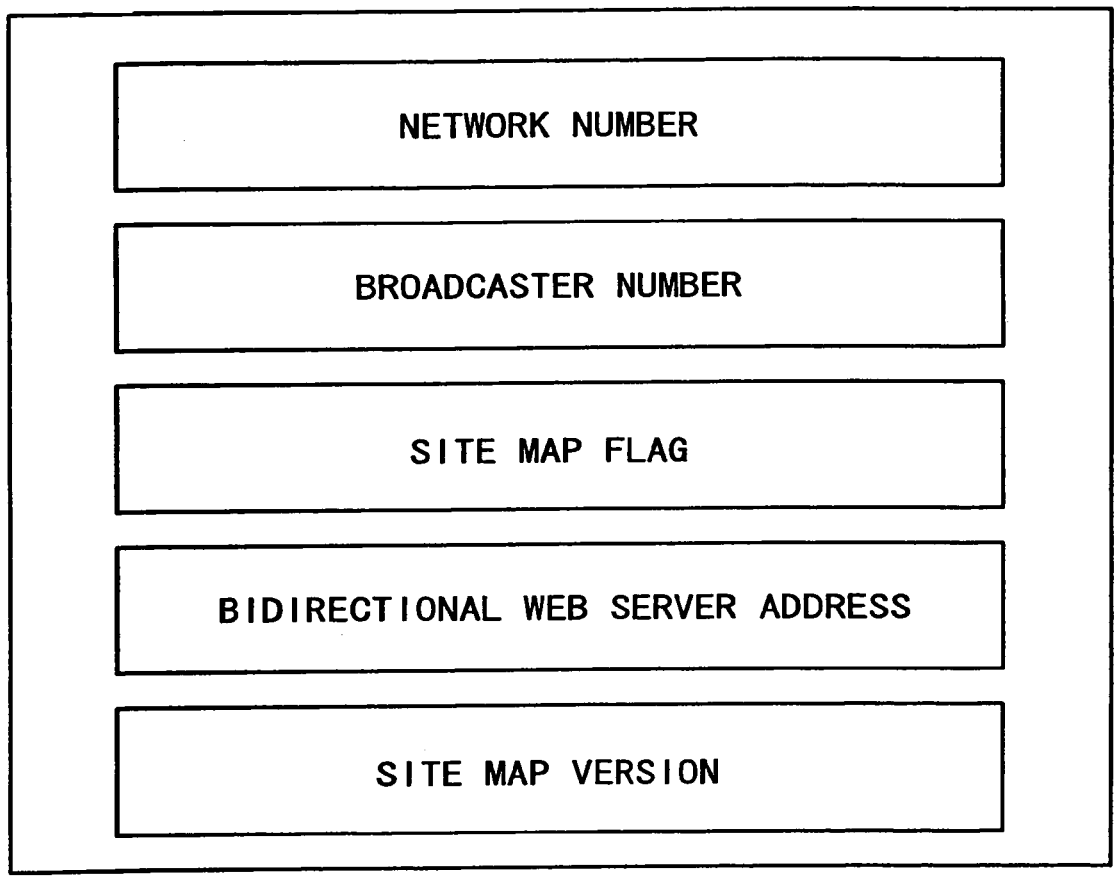
FIG. 3 is a diagram showing a data structure of broadcaster information.

FIG. 3 is a diagram showing a data structure of broadcaster information sent from a broadcasting station side to aid in setting related to a communication form of data transmission and reception performed between a digital broadcast receiving apparatus and a bidirectional server. As shown in FIG. 3, the broadcaster information includes: a network number given as distinguishing information indicating a type of digital broadcasting; a broadcaster number given as distinguishing information for identifying a broadcaster; a site map flag given as distinguishing information indicating presence or absence of a bidirectional WEB server for a broadcast program transmitted by the broadcaster; a bidirectional WEB server address indicating an IP address of the bidirectional WEB server; and a site map version indicating a version of the broadcaster information. The site map flag, the bidirectional WEB server address, and the site map version of the broadcaster information obtained by receiving a digital broadcast signal and detecting a BIT from a transport stream are registered for each broadcaster, that is, in association with the broadcaster number in a predetermined storage area of the NVRAM 21. Broadcaster information including a network number and a broadcaster number is transmitted also in an existing broadcasting system. Thus, also by using an existing digital broadcast receiving apparatus, a network number and a broadcaster number can be read from broadcaster information of the data structure as shown in FIG. 3.

Figure 4:
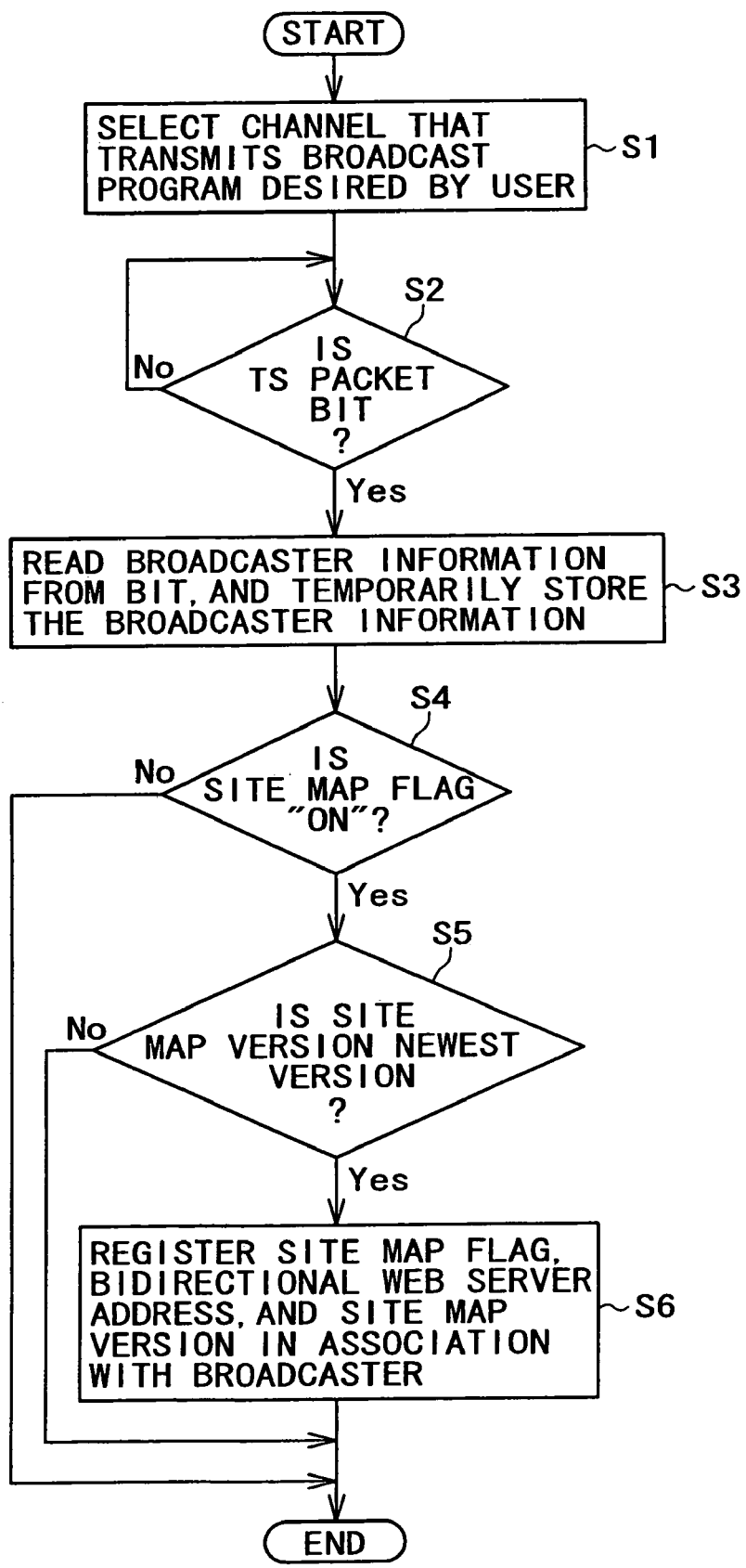
FIG. 4 is a flowchart of a method for obtaining the broadcaster information.

FIG. 4 is a flowchart of a method for obtaining broadcaster information. When a user selects a desired broadcast program using the remote control 19, for example, the tuner 13 selects a channel that transmits the broadcast program desired by the user in response to an instruction from the CPU 12, and then outputs a corresponding intermediate-frequency signal (step S1). After the channel selecting operation is completed and a transport stream is outputted from the 8PSK demodulator 14, reference is made to a packet identifier (PID) of a TS packet of data broadcast contents, SI or the like separated by the TS decoder 15 to determine whether the TS packet is BIT (step S2). When a BIT is detected, broadcaster information is read from the BIT, and the broadcaster information is temporarily stored in a buffer area of the NVRAM 21, for example (step S3). Incidentally, when no BIT is detected at the step S2, the step S2 is repeated until a BIT is detected.

Next, reference is made to a site map flag of the read broadcaster information to determine whether the site map flag is on (step S4). The site map flag being on means that a bidirectional WEB server is provided as a response server for the broadcast program transmitted by the broadcasting station side. As described above, such broadcaster information is handled as information to be registered, which information has a likelihood of being registered in a predetermined storage area within the NVRAM 21. Hence, when the site map flag is on, a site map version of the read broadcaster information is compared with a site map version of broadcaster information already registered for the broadcaster to determine whether the site map version of the read broadcaster information is newer (step S5). The site map flag being off means that no bidirectional WEB server is provided as a response server for the broadcast program transmitted by the broadcasting station side, and that data transmission and reception between the digital broadcast receiving apparatus and a bidirectional server is performed by using a BASIC procedure, as is conventional. Incidentally, when no broadcaster information is registered for the broadcaster associated with the read broadcaster information, it is determined at the step S5 that the site map version of the read broadcaster information is the newest.

When it is determined at the step S5 that the site map version of the read broadcaster information is newer than the version of the broadcaster information already registered, it is necessary to update the broadcaster information, which is registered for each broadcaster. Thus, the site map flag, a bidirectional WEB server address, and the site map version are registered in association with the broadcaster in a predetermined storage area within the NVRAM 21 (step S6).

Description will next be made of operation for data transmission and reception between the digital broadcast receiving apparatus and a response bidirectional server for the received broadcast program. As shown in FIG. 2, the digital broadcast receiving apparatus according to the first embodiment of the present invention has the modem 24 for connection via a telephone line and the network interface 25 for Internet connection. The digital broadcast receiving apparatus therefore makes it possible to use, as a form of communication for realizing the data transmission and reception, either one of a first communication form characterized by making connection to a bidirectional server via a telephone line using the modem 24, a second communication form characterized by making connection to an Internet access point managed by a provider, for example, via a telephone line using the modem 24 and making connection to a bidirectional WEB server via the Internet, and a third communication form characterized by making connection to a bidirectional WEB server via the network interface 25. The user thus needs to set a communication form to be used.

FIG. 5 is a diagram showing an example of a screen for setting a communication form to be used. A communication form to be used can be set by checking one of selecting frames represented by "□" attached to each usable communication form. Incidentally, when using the second communication form characterized by making connection to an Internet access point via a telephone line using the modem and making connection to a bidirectional WEB server via the Internet, information such as a "provider telephone number," a "user name," a "password," and the like needs to be registered on another setting screen. When using the third communication form characterized by making direct connection to a bidirectional WEB server via the Internet using the network interface, information such as an "IP address," a "subnet mask," a "default gateway," a "machine name," "DSN setting" and the like needs to be registered.

Figure 6:
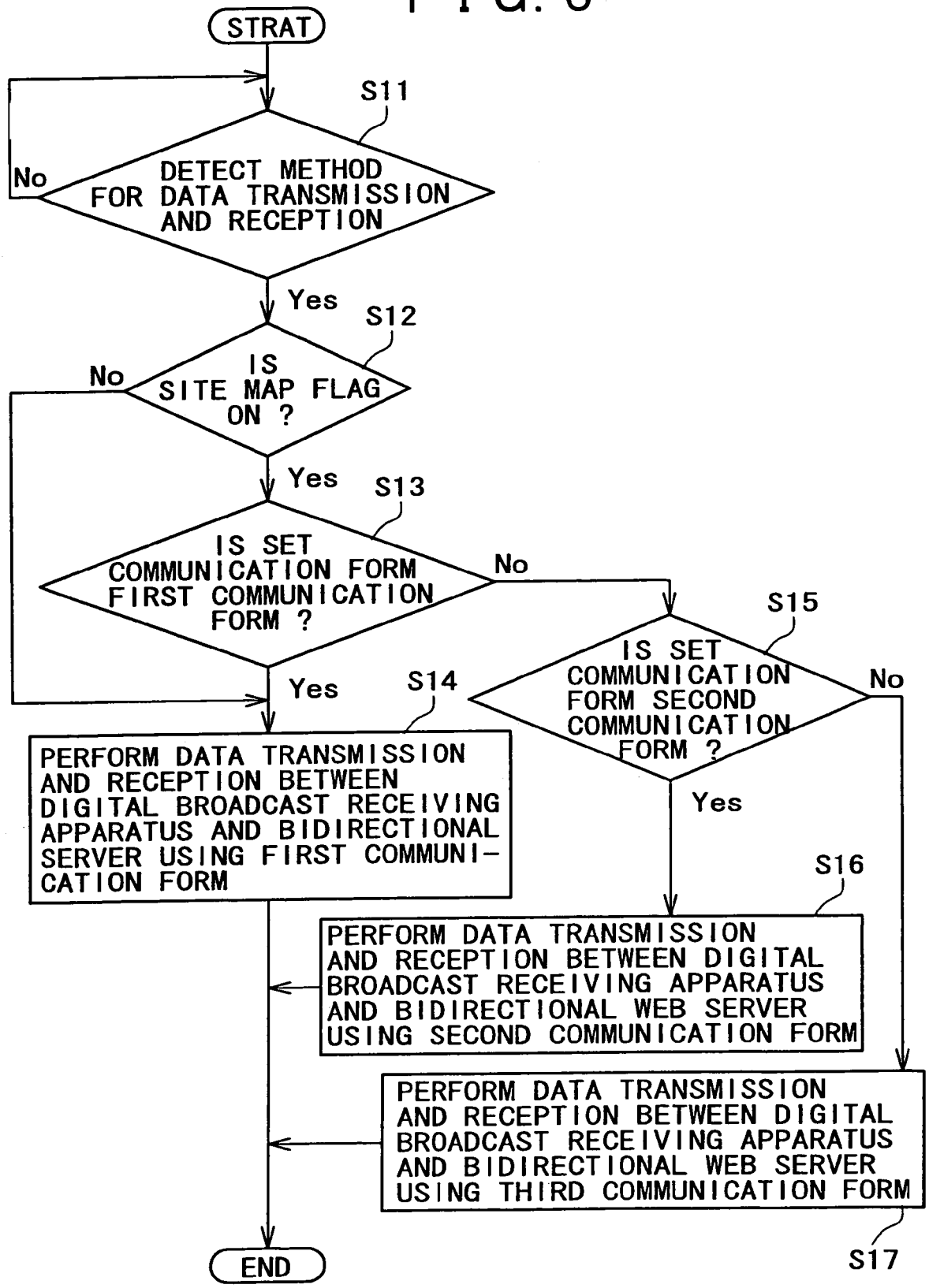
FIG. 6 is a flowchart of an outline of a method of data transmission and reception performed between the digital broadcast receiving apparatus and a bidirectional server.

FIG. 6 is a flowchart of an outline of a method for data transmission and reception performed between the digital broadcast receiving apparatus and a bidirectional server. Reference is made to data broadcast contents separated and outputted from the TS decoder 15 to determine whether the method described by ECMAScript, which is a standard of data broadcast description scripts, for transmitting and receiving data can be detected (step S11). FIG. 7 is a diagram showing an example of ECMAScript describing the method for data transmission and reception. The method for data transmission and reception shown in FIG. 7 has for example a function "browser.connect" for connection to a bidirectional server accessed by a predetermined telephone number via a telephone line, a function "browser.sendTextData" for transmitting data to the bidirectional server, a function "browser.receiveTextData" for receiving data from the bidirectional server, and a function "browser.disconnect" for disconnecting a line established between the digital broadcast receiving apparatus and the bidirectional server.

The processing at the step S11 is repeated until the method for data transmission and reception is detected. When the method for data transmission and reception is detected, reference is made to broadcaster information corresponding to a broadcast program being received to determine whether the site map flag is "ON" (step S12). As described above, the site map flag being off means that no bidirectional WEB server is provided as a response server for the broadcast program sent by the broadcasting station side, and therefore data transmission and reception between the digital broadcast receiving apparatus and a bidirectional server needs to be performed by using a BASIC procedure. When the site map flag is on at the step S12, whether a communication form to be used that is set in the digital broadcast receiving apparatus is the first communication form, that is, the communication form characterized by making connection to a bidirectional server via a telephone line using the modem is determined (step S13).

When it is determined at the step S12 that the site map flag is off and when it is determined at the step S13 that the first communication form is set as the communication form to be used, data transmission and reception is performed between the digital broadcast receiving apparatus and the bidirectional server using the first communication form (step S14). When it is determined at the step S13 that the first communication form is not set as the communication form to be used, whether the communication form to be used that is set in the digital broadcast receiving apparatus is the second communication form, that is, the communication form characterized by making connection to an Internet access point via a telephone line using the modem and making connection to a bidirectional WEB server via the Internet is determined (step S15).

When it is determined at the step S15 that the second communication form is set as the communication form to be used, data transmission and reception is performed between the digital broadcast receiving apparatus and the bidirectional WEB server using the second communication form (step S16). When it is determined at the step S15 that the second communication form is not set as the communication form to be used, data transmission and reception is performed between the digital broadcast receiving apparatus and a bidirectional WEB server using the third communication form (step S17).

Figure 8:
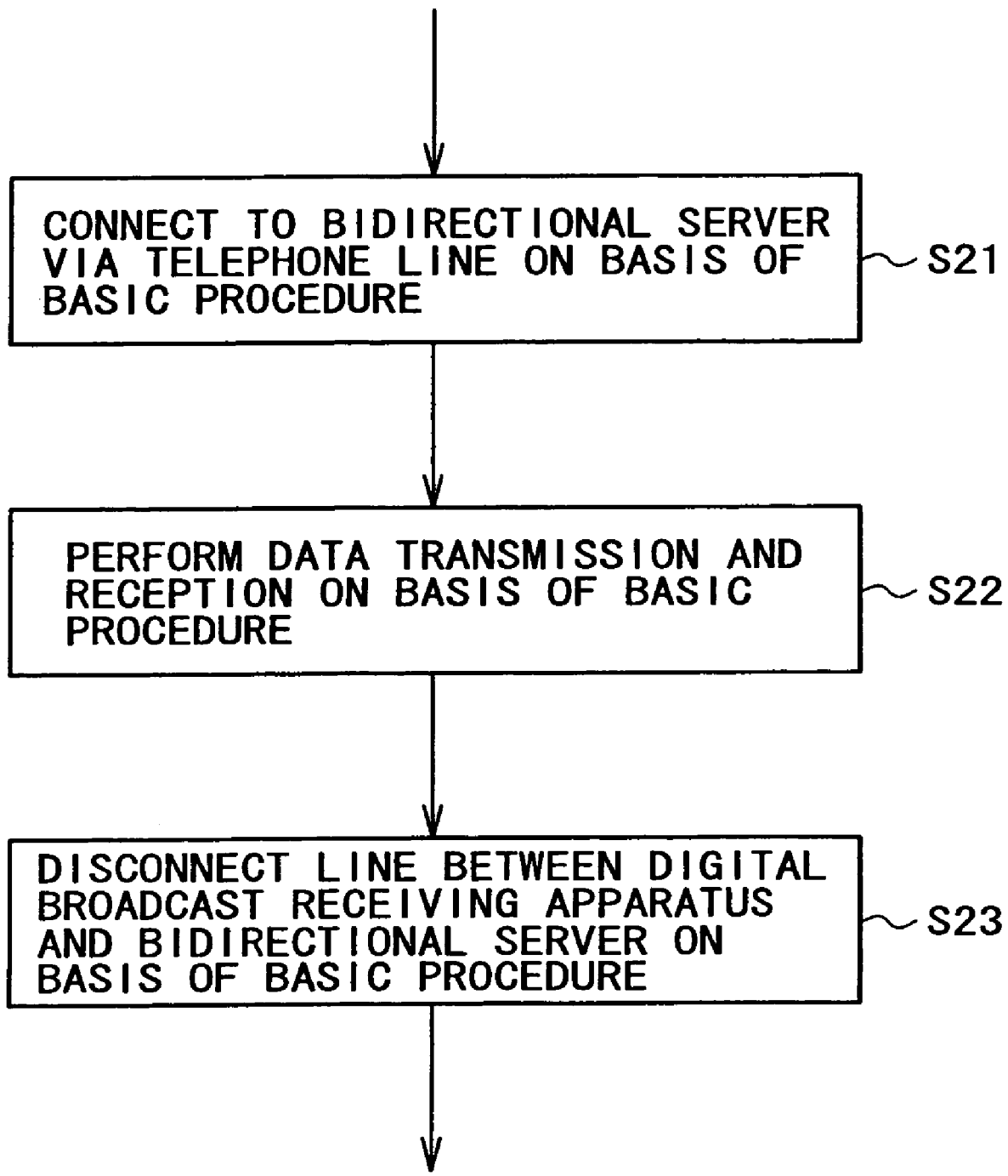
FIG. 8 is a flowchart of a method of data transmission and reception performed using a first communication form.

Data transmission and reception methods when the respective communication forms are used will next be described individually. Description will first be made of processing steps when data transmission and reception is performed between the digital broadcast receiving apparatus and the bidirectional server using the first communication form, that is, detailed processing steps of the step S14. FIG. 8 is a flowchart of a method of data transmission and reception performed using the first communication form. First, the digital broadcast receiving apparatus is connected to the bidirectional server via a telephone line by a BASIC procedure on the basis of the function "browser.connect" for line connection described in the detected method (step S21). Next, data transmission and reception is performed by the BASIC procedure on the basis of the function "browser.sendTextData" for transmitting data and the function "browser.receiveTextData" for receiving data which functions are described in the detected method (step S22). Then, the line established between the digital broadcast receiving apparatus and the bidirectional server is disconnected on the basis of the function "browser.disconnect" for line disconnection described in the detected method, and the data transmission and reception is ended (step S23).

Figure 9:
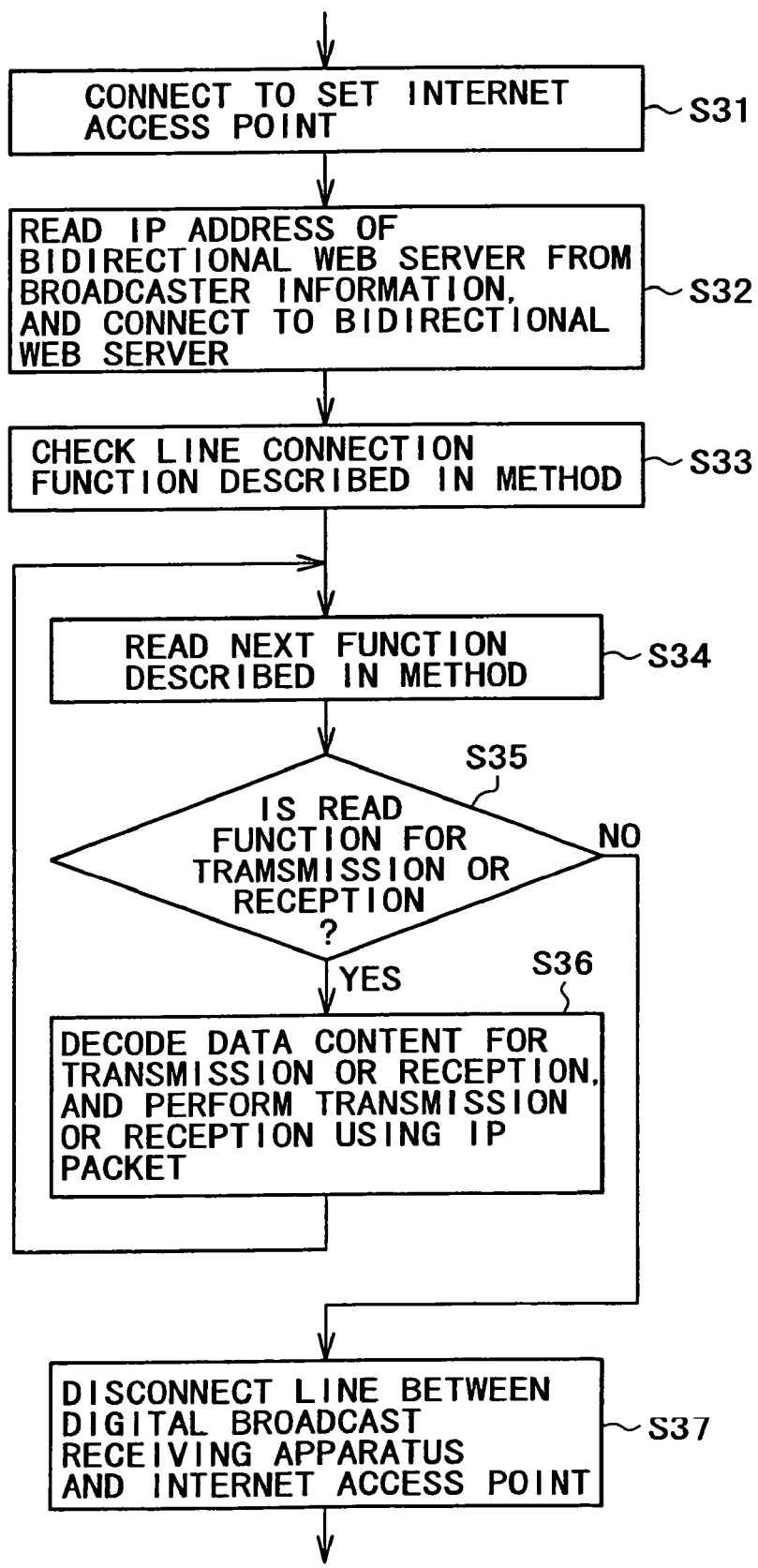
FIG. 9 is a flowchart of a method of data transmission and reception performed using a second communication form.

Description will next be made of processing steps when data transmission and reception is performed between the digital broadcast receiving apparatus and the bidirectional server using the second communication form, that is, detailed processing steps of the step S16. FIG. 9 is a flowchart of a method of data transmission and reception performed using the second communication form. First, the digital broadcast receiving apparatus is connected via a telephone line to an Internet access point, which is managed by a provider, for example, and set in the digital broadcast receiving apparatus (step S31). Next, an IP address of the bidirectional WEB server is read from the broadcaster information corresponding to the received broadcast program, and then the digital broadcast receiving apparatus is connected to the bidirectional WEB server for response related to the broadcast program (step S32). Next, the function "browser.connect" for line connection described in the detected method is checked (step S33). In the detected method, the functions for data transmission and reception are sequentially described following the function "browser.connect" for line connection. Thus, in subsequent processing, an operation is first performed to read sequentially the described functions one by one (step S34). Next, whether the read function is the function "browser.sendTextData" for data transmission or the function "browser.receiveTextData" for data reception is determined (step S35).

When it is determined at the step S35 that the read functions are the functions for transmission and reception, data itself to be transmitted and received or a data processing content related to transmitting and receiving operation represented by these functions for transmission and reception is decoded, and data transmission and reception is performed between the digital broadcast receiving apparatus and the bidirectional WEB server using an IP packet on the basis of TCP/IP (step S36). Then, the processing returns to the step S34, and the processing at the step S34 is performed again. When it is determined at the step S35 that the read function is not the function for transmission or reception, the function "browser.disconnect" for line disconnection described in the method is checked, and the line established between the digital broadcast receiving apparatus and the Internet access point is disconnected to end the data transmission and reception (step S37).

Figure 10:
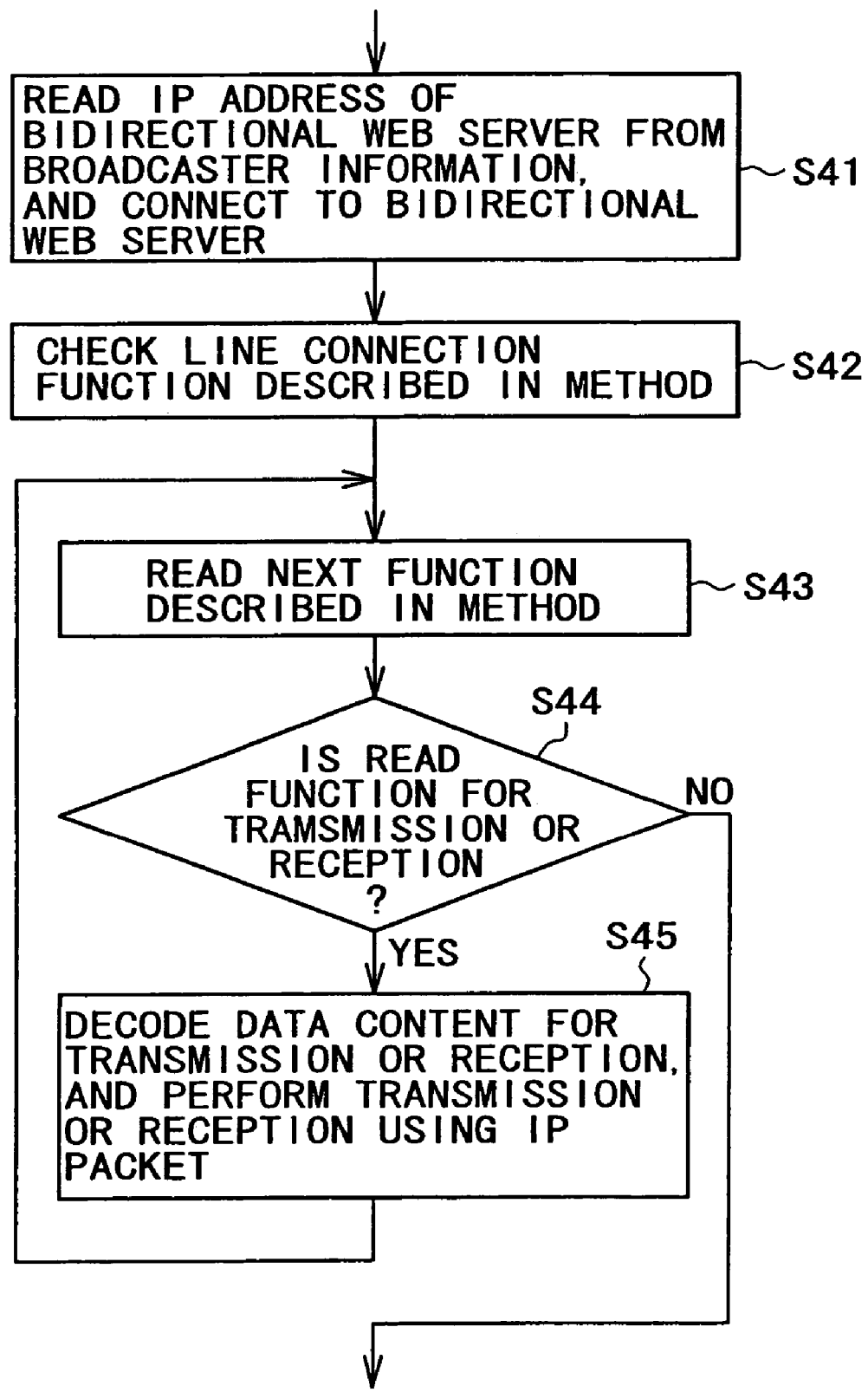
FIG. 10 is a flowchart of a method of data transmission and reception performed using a third communication form.

Description will next be made of processing steps when data transmission and reception is performed between the digital broadcast receiving apparatus and the bidirectional server using the third communication form, that is, detailed processing steps of the step S17. FIG. 10 is a flowchart of a method of data transmission and reception performed using the third communication form. First, an IP address of the bidirectional WEB server is read from the broadcaster information corresponding to the received broadcast program, and then the digital broadcast receiving apparatus is connected to the bidirectional WEB server for response related to the broadcast program (step S41). Next, the function "browser.connect" for line connection described in the detected method is checked (step S42). In the detected method, the functions for data transmission and reception are sequentially described following the function "browser.connect" for line connection. Thus, in subsequent processing, an operation is first performed to read sequentially the described functions one by one (step S43). Next, whether the read function is the function "browser.sendTextData" for data transmission or the function "browser.receiveTextData" for data reception is determined (step S44).

When it is determined at the step S44 that the read functions are the functions for transmission and reception, data itself to be transmitted and received or a data processing content related to transmitting and receiving operation represented by these functions for transmission and reception is decoded, and data transmission and reception is performed between the digital broadcast receiving apparatus and the bidirectional WEB server using an IP packet on the basis of TCP/IP (step S45). Then, the processing returns to the step S43, and the processing at the step S43 is performed again. When it is determined at the step S44 that the read function is not the function for transmission or reception, the function "browser.disconnect" for line disconnection described in the method is checked, and the data transmission and reception between the digital broadcast receiving apparatus and the bidirectional WEB server is ended.

Data transmission and reception between the digital broadcast receiving apparatus and a bidirectional server related to a broadcast program is performed via a telephone line using the modem 24 (including a case of connection to an Internet access point) or via the Internet using the network interface 25, as described above. Thus, in order that a user can identify a line where data transmission and reception is being performed and grasp cost and the like of data transmission and reception, it is desirable to attach a display device (first used line display means) including for example an LED or the like indicating that the data transmission and reception is being performed via a telephone line and a display device (second used line display means) indicating that the data transmission and reception is being performed via the Internet to an appropriate part easily visible to the user in the digital broadcast receiving apparatus.

As described above, the digital broadcast receiving apparatus according to the first embodiment has the network interface 25 for performing data transmission and reception via the Internet. Therefore data transmission and reception between the digital broadcast receiving apparatus and a bidirectional server related to a received broadcast program can be performed via the Internet at a high speed and a low cost. The digital broadcast receiving apparatus also has the modem 24 for performing data transmission and reception via a telephone line. Therefore, even when only a bidirectional server for telephone lines is provided by a broadcasting station side for a received broadcast program, data transmission and reception can be performed between the digital broadcast receiving apparatus and the bidirectional server for response provided by the broadcasting station side by using the modem 24.

In addition, an IP address of a bidirectional server for the Internet related to a broadcast program transmitted by a transport stream is recorded and transmitted as one piece of broadcaster information in a BIT, which is one table of SI included in the transport stream. The digital broadcast receiving apparatus has reading means for detecting the BIT and reading the IP address of the bidirectional server for the Internet which address is recorded in the BIT. It is therefore possible to eliminate a need for registering access information on a bidirectional server related to each broadcast program in advance in the digital broadcast receiving apparatus and thus simplify a system configuration related to data transmission and reception. It is also possible for the broadcasting station side to send access information on a bidirectional server related to each broadcast program by a broadcast wave and change a bidirectional server prepared for data transmission and reception as required. Further, as one piece of broadcaster information, a site map flag is included in the BIT and transmitted as distinguishing information for distinguishing whether the bidirectional server for the Internet related to the broadcast program transmitted by the transport stream is provided. Therefore, by referring to the site map flag, an appropriate communication form can be selected quickly and surely for data transmission and reception between the digital broadcast receiving apparatus and the bidirectional server. Further, even when there is an update to broadcaster information, since a site map version is included as one piece of broadcaster information in the BIT and transmitted to make it possible to determine order of creation of the different pieces of broadcaster information, it is possible to determine whether the broadcaster information is already registered. When the broadcaster information is already registered, a communication file and the like created on the basis of the broadcaster information are available, and hence it is possible to readily establish a communication line between the digital broadcast receiving apparatus and a bidirectional server, for example.

Further, a method for performing data transmission and reception on the basis of a BASIC procedure between the digital broadcast receiving apparatus and a bidirectional server for telephone lines related to the broadcast program is included and transmitted in data broadcast contents included in the transport stream. The digital broadcast receiving apparatus has decoding means for detecting the method and decoding data itself to be transmitted and received or a data processing content related to transmitting and receiving operation. The digital broadcast receiving apparatus performs data transmission and reception using IP packets via the network interface 25 on the basis of the decoded data itself or data processing content. Therefore data transmission and reception between the digital broadcast receiving apparatus and a bidirectional server can be performed using either of a form of communication via a telephone line and a form of communication via the Internet on the basis of the common method. It is thus possible to simplify the creation of a method for realizing data transmission and reception and hence reduce cost.

The digital broadcast receiving apparatus further includes a display device indicating that data transmission and reception between the digital broadcast receiving apparatus and a bidirectional server is being performed via a telephone line and a display device indicating that data transmission and reception between the digital broadcast receiving apparatus and a bidirectional server is being performed via the Internet. Therefore a line used for the data transmission and reception between the digital broadcast receiving apparatus and the bidirectional server can be readily identified. Thus a user can roughly grasp cost and the like of the data transmission and reception.

It is to be noted that the digital broadcast receiving apparatus and the communication information transmitting method described according to the first embodiment are intended not to limit the present invention but to be illustrative of the present invention. The technical scope of the present invention is defined by claims, and various design changes may be made within the technical scope described in the claims. For example, as to the broadcaster information, while the broadcaster information employs a data structure including a network number, a broadcaster number, a site map flag, a bidirectional WEB server address, and a site map version, the broadcaster information can employ a data structure including a network number, a broadcaster number, and a bidirectional WEB server address, a data structure including a network number, a broadcaster number, a site map flag, and a bidirectional WEB server address, or the like. Further, while the display devices for identifying a line being used are illustrated in the foregoing embodiment, display devices for identifying a communication form being used may be attached to the digital broadcast receiving apparatus. Specifically, the digital broadcast receiving apparatus can be provided with a display device indicating that the first communication form is being used, a display device indicating that the second communication form is being used, and a display device indicating that the third communication form is being used in data transmission and reception between the digital broadcast receiving apparatus and a bidirectional server.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A digital broadcast receiving apparatus having a function of receiving a digital broadcast signal and generating a video signal and an audio signal from a transport stream associated with a broadcast program selected by a user, said digital broadcast receiving apparatus comprising:
    address reading means for reading from the transport stream an IP address of a bidirectional server associated with the selected broadcast program;
    detecting means for detecting, from the transport stream, instructions for performing a method of at least one of data transmission and data reception between the digital broadcast receiving apparatus and the bidirectional server;
    a modem for performing the method of at least one of data transmission and data reception over a telephone line;
    a network interface for performing the method of at least one of data transmission and data reception over the Internet; and
    wherein the method of at least one of data transmission and data reception is performed via the modem if a first communication form is selected by the user, is performed via the modem using an Internet provider if a second communication form is selected by the user, and is performed via the network interface using if a third communication form is selected by the user.

2. The digital broadcast receiving apparatus as claimed in claim 1, further comprising communication form selecting means that includes first used line display means indicating that the data transmission and reception between the digital broadcast receiving apparatus and the bidirectional server is to be performed over the telephone line, second used line display means indicating that the data transmission and reception between the digital broadcast receiving apparatus and the bidirectional server is to be performed over the Internet using an Internet provider, and third used line display means indicating that the data transmission and reception between the digital broadcast receiving apparatus and the bidirectional server is to be performed directly over the Internet.

3. A communication information transmitting method for notifying, from a broadcasting station side, information for aiding in data transmission and reception to allow the data transmission and reception to be performed between a bidirectional server and a digital broadcast receiving apparatus having a function of receiving a digital broadcast signal and generating a video signal and an audio signal from a transport stream associated with a broadcast program selected by a user, said method comprising:
    providing, in the transport stream, instructions for performing a method of at least one of data transmission and data reception between said digital broadcast receiving apparatus and a bidirectional server associated with the selected broadcast program; and
    providing, in the transport stream, broadcaster information including at least an IP address of the associated bidirectional server.

4. A communication information transmitting method for notifying, from a broadcasting station side, information for aiding in data transmission and reception to allow the data transmission and reception to be performed between a bidirectional server and a digital broadcast receiving apparatus having a function of receiving a digital broadcast signal and generating a video signal and an audio signal from a transport stream associated with a broadcast program selected by a user, said method comprising:
    providing, in the transport stream, instructions for performing a method of at least one of data transmission and data reception between said digital broadcast receiving apparatus and the bidirectional server; and
    providing, in the transport stream, broadcaster information including at least distinguishing information indicating whether a bidirectional server is associated with the selected broadcast program, and including an IP address of the associated bidirectional server when the distinguishing information indicates that such associated bidirectional server exists.

5. The communication information transmitting method as claimed in claim 3 or claim 4 wherein the broadcaster information includes version information to determine, even when there is an update to the broadcaster information, an order of creation of each portion of the broadcaster information.

* * * * *